Oct. 19, 1954 — G. W. ONKSEN — 2,691,905
APPARATUS FOR MAKING DIES
Filed Dec. 19, 1949 — 3 Sheets-Sheet 1

Inventor
George W. Onksen
By Willits, Helmig & Baillio
Attorneys

Inventor
George W. Onksen
By Willits, Helmig & Baillie
Attorneys

Oct. 19, 1954  G. W. ONKSEN  2,691,905
APPARATUS FOR MAKING DIES
Filed Dec. 19, 1949  3 Sheets-Sheet 3

Inventor
George W. Onksen
By
Willits, Helwig & Baillie
Attorneys

Patented Oct. 19, 1954

2,691,905

UNITED STATES PATENT OFFICE 2,691,905

APPARATUS FOR MAKING DIES

George W. Onksen, Anderson, Ind., assignor to General Motors Corporation, Detroit, Mich., a corporation of Delaware Application December 19, 1949, Serial No. 133,767

8 Claims. (Cl. 76—4)

The present invention relates to dies for forming light reflecting signal devices and more particularly to a method and apparatus for making such dies.

In the forming of reflector signal devices of glass or transparent plastic having a reflecting surface comprising a plurality of contiguous similarly oriented cube corner reflecting unit apertures, it has been the practice to assemble a plurality of hexagonal rods in a cluster to provide a molding die plunger for forming the reflecting surface. Each of the rods has formed on one end a cube corner consisting of three square surfaces arranged in series around the longitudinal axis to merge at a common point with adjacent surfaces angularly spaced 90 degrees and the diagonal axis of the cube corner coinciding with the longitudinal axis of the rod. With the rods arranged in a cluster the cube corners cooperate to provide a matrix of cube corner units for forming a reflecting surface of cube corner apertures. Where it is considered desirable to provide a cube corner reflecting surface on a transparent body of substantially uniform thickness having an outer curved surface the die plunger is formed of a plurality of rods assembled in a cluster with the cube corner ends axially displaced from the center of the cluster outwardly to conform to the outer curved surface.

It is an object of the present invention to provide an improved method and apparatus for assembling such a die.

This and other objects are attained in accordance with the present invention by arranging a cluster of the rods in apparatus adapted to form the external configuration of the cluster and simultaneously self-align the cube corner ends of the rods on a predetermined curvature for clamping of the cluster as a unit to form a die plunger.

Figure 1:
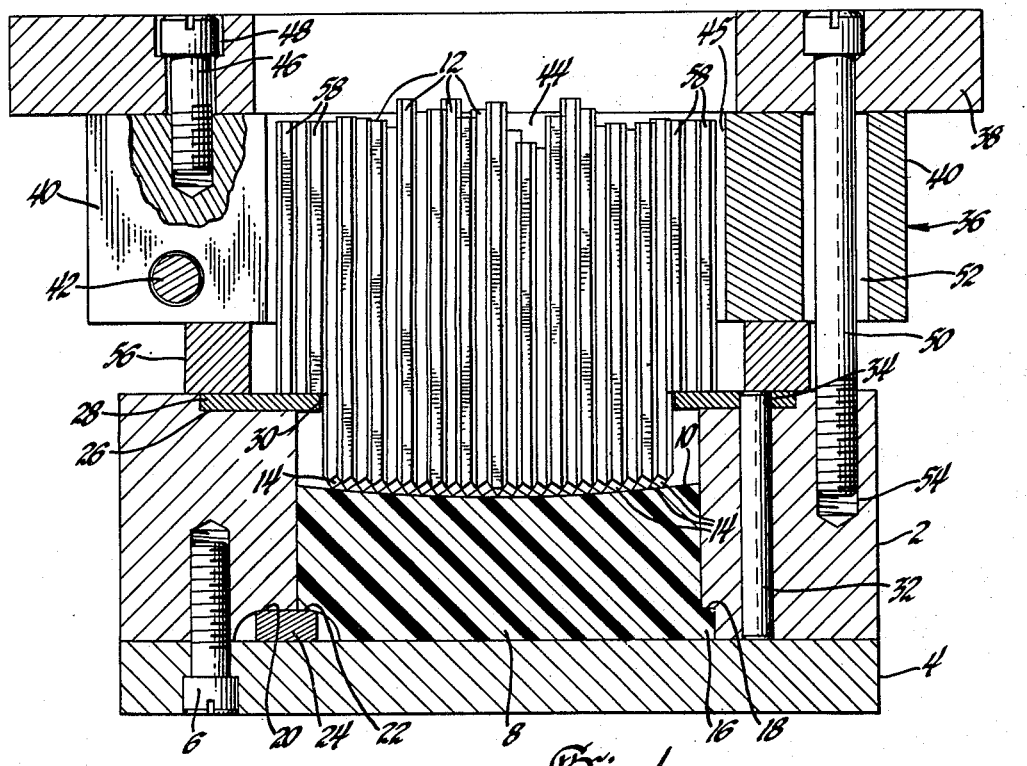
Figure 2:
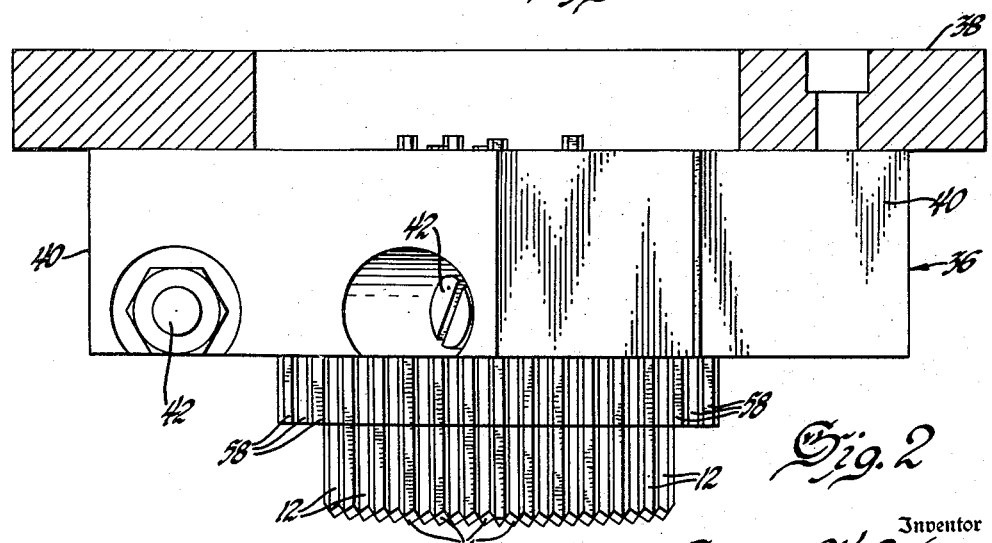
Figure 3:
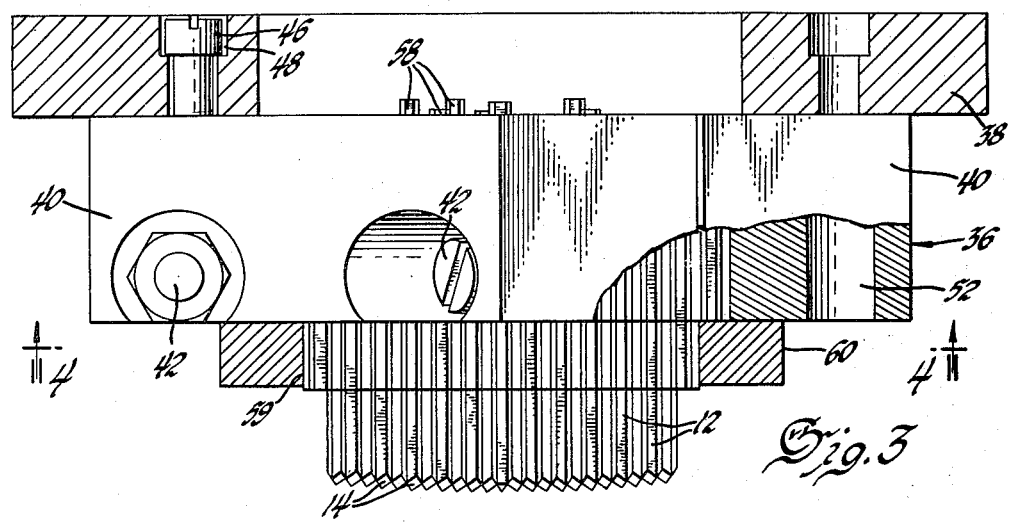
Figure 4:
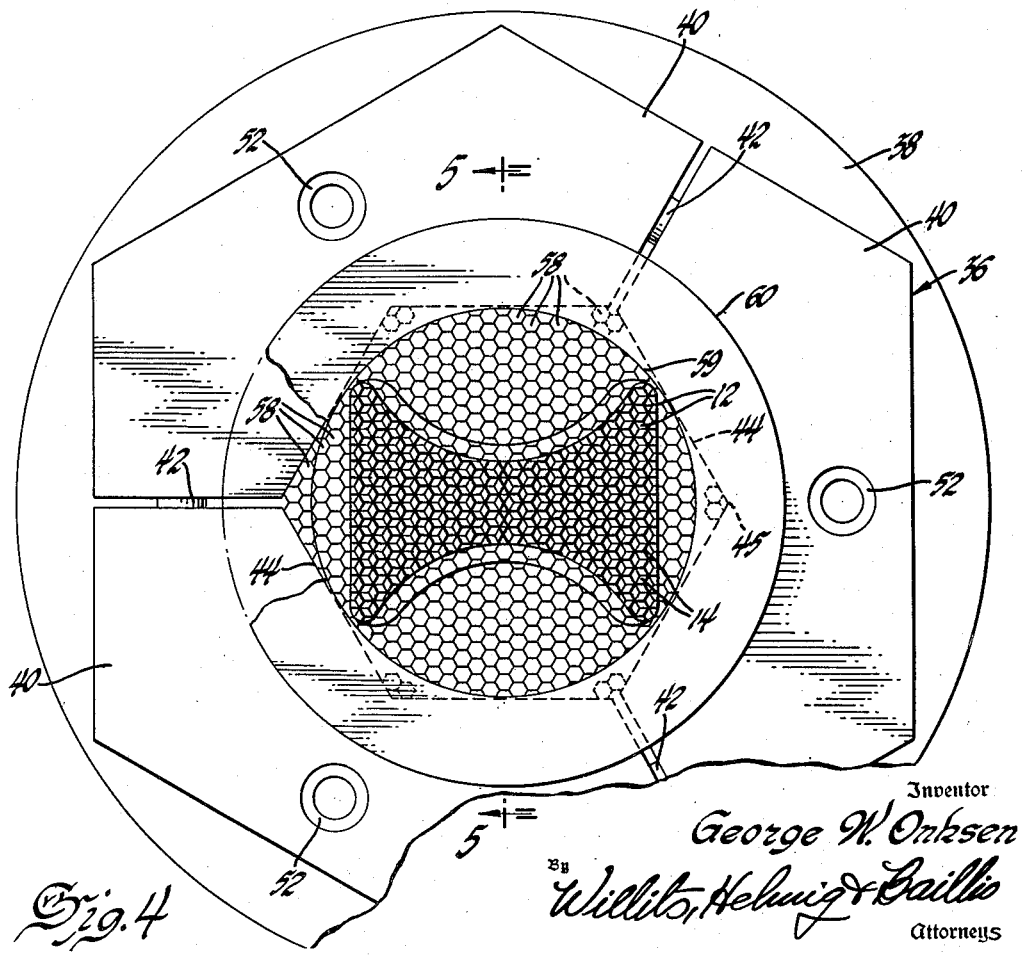
Figure 5:
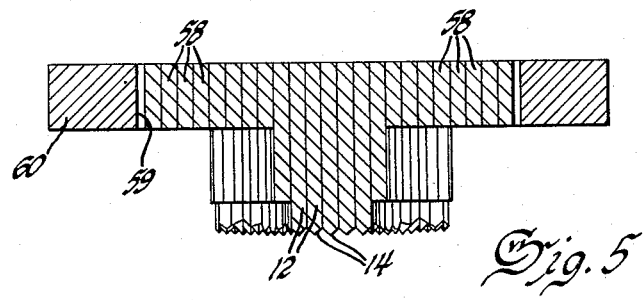
Figure 6:
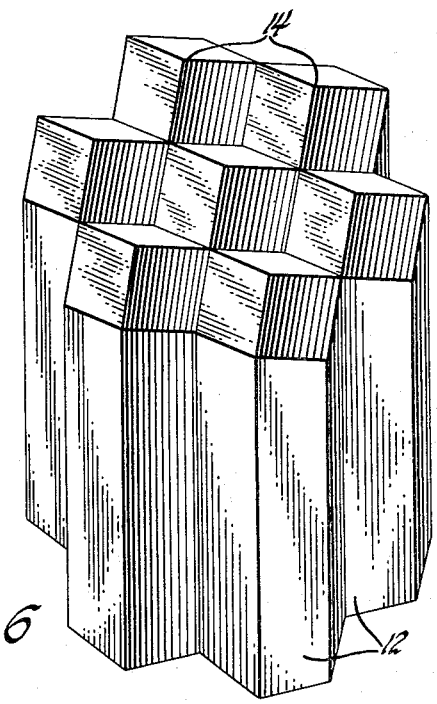

For a better understanding of the invention reference may be had to the accompanying drawings in which Figure 1 is an enlarged elevational view in cross section of one form of a die plunger assembling apparatus of my invention; Figure 2 is an enlarged elevational view partly in cross section of the clamping assembly of the apparatus; Figure 3 is a view similar to Figure 2; Figure 4 is a view in plan illustrating the bottom of the finished plunger and taken on line 4—4 of Figure 3; Figure 5 is a view of the finished plunger taken on line 5—5 of Figure 4; and Figure 6 is an enlarged perspective view illustrating the cube corner orientation of the die plunger.

Referring now to the drawings and particularly Figure 1, there is illustrated apparatus for forming plunger dies in accordance with the present invention comprising a cylindrical member 2 attached to a supporting plate 4 by spaced threaded members 6. Positioned within the cylindrical member 2 is a cube corner aligning member 8 having a curved surface 10 of predetermined curvature and adapted to support a plurality of hexagonal rods 12 for alignment of their ends on the surface 10. The aligning member 8 is made of a material, preferably a plastic, such as the phenol-formaldehyde thermosetting cast resin known as "Catalin" which is considerably softer than the material of the hexagonal rods to prevent injury to the cube corner ends 14 of the rods when they are positioned on the curved surface for alignment. The aligning member 8 is secured between the cylindrical member 2 and the supporting member 4 by providing an annular flange 16 which is adapted to be recessed in an annular flange 16 which is adapted to be recessed in an annular groove 18 in cylindrical member 2. To locate the member 8 in cylindrical member 2 cooperating keyways 20 and 22 adapted to receive a locking key 24 are provided. Positioned in an annular recess 26 at the upper end of the cylindrical member 2 is an annular ring 28 having an aperture 30 of suitable shape to provide the die matrix with a slightly larger external configuration than that desired for the reflecting surface of cube corner apertures on the reflecting device. While the external configuration of the die matrix formed by the aperture 30 is channel-like as illustrated in Figure 4, it will be understood that other configurations such as circular, hexagonal, etc. may be desired and are predetermined by the shape of the aperture 30. The annular ring 28 is located in the recess 26 by a locating pin 32 recessed in the cylindrical member 2 with one end projecting into a locating aperture 34 in the ring 28.

Mounted on the upper end of the cylindrical member 2 is a clamping assembly 36 which is adapted to temporarily clamp the clustered and aligned hexagonal rods for removal from the aligning apparatus. The clamping assembly 36 comprises a clamping ring 38 and a plurality of clamping sectors 40 connected in series by threaded fasteners 42 to form a clamp for the clustered rods, see Figures 3, 4 and 5. As illustrated in Figure 4 the clamping sectors 40 are provided with angularly spaced inner surfaces 44 which cooperate when the clamping sectors are connected in series to provide a hexagonal aperture 45.

The clamping sectors 40 are connected to the clamping ring 38 by threaded members 46 which are loosely positioned in apertures 48 to adapt the clamping sections 40 to relative adjustment on the clamping ring. The clamping assembly 36 is in turn connected to the cylindrical member 2 by the threaded members 50 which pass through the clamping ring 38 and bores 52 in the clamping sectors 40 to engage threaded recesses 54 in the cylindrical member 2. The bores 52 in the clamping sectors 40 are substantially larger than the diameter of the threaded members 50 to provide for relative adjustment of the clamping sectors when the clamping assembly is attached to the cylindrical member 2. A spacer 56 of predetermined thickness, see Figure 1, in the form of an annular ring or a continuous series of rectangular or square blocks is interposed between the clamping assembly 36 and the cylindrical member 2 to provide for cutting the plunger to a predetermined length as will be obvious from the following description of the forming of the die plunger.

In assembling the apparatus for the forming of a die plunger the aligning member 8 is positioned in the lower end of the cylindrical member 2 with the keyways 20 and 22 in alignment. The key 24 is then positioned in the aligned keyways and the supporting plate 4 is attached and secured to the cylindrical member 2 by the threaded members 6. With the supporting plate 4, cylindrical member 2, and aligning body 8 assembled, the annular ring 28 of desired internal aperture configuration is positioned in the recess 26 with the pin 32 recessed in the locater aperture 34. Thereafter the spacer 56 is positioned on the cylindrical member 2 and annular ring 28 and the clamping assembly 36 is loosely attached by the threaded members 50. With the apparatus assembled, spacing shims are placed between the adjacent ends of the sector clamps 40 to expand the hexagonal aperture 45 for loosely mounting the hexagonal rods of the die plunger.

In assembling the hexagonal rods of the die plunger, the apparatus may be tilted slightly to cause the rods to lean against one of the wall surfaces of aperture 45. The die plunger of hexagonal rods is then formed by first inserting dummy rods 58 to form a row with the lower ends abutting the upper surface of annular ring 28. Successive rows are then arranged until the rods 58 overhang the edge of aperture 30. Thereafter, hexagonal rods 12 having the cube corner ends 14 formed thereon are inserted in successive layers with the ends resting on the curved surface 10 of the aligning member 8. In each of the rows of rods arranged across the aperture, dummy rods 58 will form part of the row between the guiding edges of aperture 45 and the aperture 30 in the annular ring 28. When the aperture 45 is filled the shims are removed from between the adjacent ends of the sector clamps 40 and the cluster of rods is tapped lightly to cause the rods to nest. Thereafter the fastening members 42 are adjusted uniformly to draw the sector clamps upon the cluster until the cluster of rods is firmly secured in the clamping assembly. With the cluster firmly secured, the clamping and cluster assembly is removed from the cylindrical member 2 and the peripheral dummy rods 58 projecting below the sector clamps 40 are ground to a circular configuration of a predetermined diameter. The cluster of hexagonal rods is then secured to form the die plunger by passing the ends of the clustered rods through the circular aperture 59 of a heat-expanded collar 60, see Figure 5. The collar 60 is formed with an internal diameter in the cold condition which is slightly less than the diameter of the circular periphery of the cluster and it is heated to expand the aperture so that the cluster may be passed into the collar for securing the cluster by shrinking the collar thereon. After collar 60 has cooled, firmly securing the cluster of rods, the periphery of pins 12 outlined by aperture 30 of plate 28 is machined to a final shape as required for the reflecting device. Thereafter, the clamping sectors 40 and the clamping ring 38 are removed, and the upper ends of the rods are cut and subsequently ground to align the upper ends with the upper surface of collar 60 as shown in Fig. 5. With the grinding of the rods completed the die plunger is suitable for positioning in a molding apparatus to form the die plunger thereon.

With a process and apparatus such as I have described the plunger die of hexagonal rods may be assembled with a uniform alignment of the rod ends without the costly step of cutting each of the rods to exactly the same length to obtain uniform alignment of the rod ends.

While the embodiment of the present invention as herein disclosed constitutes a preferred form, it is to be understood that other forms might be adopted all coming within the scope of the claims which follow.

What I claim as new and desire to secure by Letters Patent of the United States is:

1. Apparatus for clamping a cluster of elongated mold elements for forming a die plunger comprising an annulus, a plurality of clamping sectors adjustably secured in series to said annulus, adjustable fastening means connecting the adjacent ends of said clamping sectors to permit radial adjustment of said clamping sectors on said annulus, and an apertured member detachably secured to said annulus, said member having an aperture configuration adapted to determine the peripheral configuration of said cluster.

2. In apparatus for assembling and clamping a cluster of elongated mold elements to form a die plunger with a matrix conforming to a predetermined contour, a walled member having a closed end with an inner aligning surface for receiving and transversely aligning the ends of said mold elements, an apertured member positioned on the open end of said walled member, said apertured member having an aperture configuration adapted to determine the peripheral configuration of said cluster and a clamping assembly removably connected to the open end of said walled member for clustering and securing said mold elements.

3. In apparatus for assembling and clamping a cluster of elongated mold elements to form a die plunger with a matrix conforming to a predetermined contour, a cylindrical member, an aligning member with a curved aligning surface positioned in said cylindrical member, a supporting plate connectable to one end of said cylindrical member for securing said aligning member therein, an annular ring concentrically positioned on the other end of said cylindrical member said ring having an aperture configuration adapted to determine the peripheral configuration of said cluster, a clamping assembly removably connected to said cylindrical member for assembling and clamping a plurality of elongated mold elements with ends aligned on said aligning surface, said clamping assembly comprising an annulus, a plurality of clamping sectors adjustably secured in series to said annulus and adjustable fastening means connecting adjacent ends of said clamping sectors to permit radial adjustment of said clamping sectors on said annulus, and a spacer member positioned between said cylindrical member and said clamping assembly to determine the length of said elongated mold elements extending beyond said clamping sectors.

4. In apparatus for assembling and clamping a cluster of elongated mold elements to form a die plunger with a matrix conforming to a predetermined contour, a cylindrical member having a closed end with an inner aligning surface for receiving and transversely aligning the ends of said mold elements, an annular ring positioned on the open end of said cylindrical member, said ring having an aperture configuration adapted to determine the peripheral configuration of said cluster, and a clamping assembly for clustering and securing said mold elements, said assembly comprising an annulus, a plurality of clamping sectors adjustably secured in series to said annulus and adjustable fastening means connecting adjacent ends of said sectors for radially adjusting said clamping sectors on said annulus.

5. In an apparatus for assembling and clamping a cluster of elongated mold elements to form a die plunger with a matrix conforming to a predetermined contour, a walled member having a closed end with an inner aligning surface for receiving and transversely aligning the ends of said mold elements, a clamping assembly removably connected to the open end of said walled member for clustering and securing said mold elements, and a spacer member positioned between said walled member and said clamping assembly to determine the length of said elongated mold elements extending beyond said clamping assembly.

6. In an apparatus for assembling and clamping a cluster of elongated mold elements to form a die plunger with a matrix conforming to a predetermined contour, a walled member having a closed end with an inner aligning surface for receiving and transversely aligning the ends of said said mold elements, an apertured member positioned on the open end of said walled member, said apertured member having an aperture configuration adapted to determine the peripheral configuration of said cluster, a clamping assembly removably connected to the open end of said walled member for clustering and securing said mold elements and a spacer member positioned between said walled member and said clamping assembly to determine the length of said elongated mold elements extending beyond said clamping assembly.

7. In an apparatus for assembling and clamping a cluster of elongated mold elements to form a die plunger with a matrix conforming to a predetermined contour, a member having an upper aligning surface for receiving and transversely aligning the ends of said mold elements, said aligning surface being of a material softer than the material of said mold elements to prevent injury to the ends of said mold elements, an apertured member positioned above said aligning surface, said apertured member having an aperture configuration adapted to determine the peripheral configuration of said cluster, and a clamping assembly positioned above said apertured member and removably connected to said first mentioned member for clustering and securing said mold elements.

8. In an apparatus for assembling and clamping a cluster of elongated mold elements to form a die plunger with a matrix conforming to a predetermined contour, a walled member having a closed end with an inner aligning surface for receiving and transversely aligning the ends of said mold elements, said aligning surface being of a material softer than the material of said mold elements to prevent injury to the ends of said mold elements, an apertured member positioned on the open end of said walled member, said apertured member having an aperture configuration adapted to determine the peripheral configuration of said cluster, and a clamping assembly removably connected to the open end of said walled member for clustering and securing said mold elements.

References Cited in the file of this patent

UNITED STATES PATENTS

| Number | Name | Date |
|---|---|---|
| 1,328,688 | Pond | Jan. 20, 1920 |
| 1,372,661 | Secord | Mar. 22, 1921 |
| 1,501,246 | Soderberg | July 15, 1924 |
| 1,591,572 | Stimson | July 6, 1926 |
| 1,605,519 | Day | Nov. 2, 1926 |
| 1,897,893 | Evans | Feb. 14, 1933 |
| 1,908,774 | Maier | May 16, 1933 |
| 1,992,322 | Nulf et al. | Feb. 26, 1935 |
| 2,056,491 | Stimson | Oct. 6, 1936 |
| 2,132,583 | Skogsberg | Oct. 11, 1938 |
| 2,188,365 | Lent et al. | Jan. 30, 1940 |
| 2,315,721 | Martin | Apr. 6, 1943 |
| 2,440,963 | Luce | May 4, 1948 |
| 2,441,747 | Beshgetoor | May 18, 1948 |